United States Patent
Kim et al.

(10) Patent No.: US 12,420,638 B2
(45) Date of Patent: Sep. 23, 2025

(54) SYSTEM AND METHOD FOR CONTROLLING SOUND OUTPUT IN VEHICLE

(71) Applicants: Hyundai Motor Company, Seoul (KR); Kia Corporation, Seoul (KR)

(72) Inventors: Ki Chang Kim, Gyeonggi-do (KR); Tae Kun Yun, Gyeonggi-do (KR); Sang Jin Hong, Seoul (KR); Dong Chul Park, Gyeonggi-do (KR); Eun Soo Jo, Gyeonggi-do (KR); Jin Sung Lee, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 79 days.

(21) Appl. No.: 18/615,751

(22) Filed: Mar. 25, 2024

(65) Prior Publication Data
US 2025/0058629 A1    Feb. 20, 2025

(30) Foreign Application Priority Data
Aug. 14, 2023    (KR) .................. 10-2023-0106467

(51) Int. Cl.
   *B60K 35/26*      (2024.01)
   *B60K 35/25*      (2024.01)
(52) U.S. Cl.
   CPC ............. *B60K 35/26* (2024.01); *B60K 35/25* (2024.01)
(58) Field of Classification Search
   CPC ................................. B60K 35/25; B60K 35/26

USPC ......................................................... 701/36
See application file for complete search history.

(56) References Cited

U.S. PATENT DOCUMENTS

| | | | |
|---|---|---|---|
| 10,068,620 B1 | 9/2018 | Lin et al. | |
| 11,046,225 B2 | 6/2021 | Mergl et al. | |
| 11,485,231 B2 | 11/2022 | Winton et al. | |
| 11,639,127 B2* | 5/2023 | Mergl | B60N 2/70 |
| | | | 701/36 |
| 12,094,335 B2* | 9/2024 | Dhagare | G06F 3/167 |
| 12,128,805 B2* | 10/2024 | Sato | B60N 2/976 |
| 12,347,047 B2* | 7/2025 | Rober | B60K 35/211 |
| 2011/0010269 A1 | 1/2011 | Ballard | |
| 2013/0294619 A1 | 11/2013 | Valeri et al. | |
| 2019/0016347 A1 | 1/2019 | Mergl et al. | |

(Continued)

FOREIGN PATENT DOCUMENTS

| KR | 10-1744716 B1 | 6/2017 |
|---|---|---|
| KR | 10-1856935 B1 | 5/2018 |

(Continued)

*Primary Examiner* — Andrew Joseph Rudy
(74) *Attorney, Agent, or Firm* — Fox Rothschild LLP

(57) ABSTRACT

A system and a method for controlling sound output in a vehicle can enhance driving sensitivity. The system includes a sensing device that obtains vehicle information of the vehicle, a sound device that plays and outputs a vehicle sound through speakers, a seat device that controls seat vibration based on the vehicle sound, and a control device connected with the sensing device, the sound device, and the seat device. The control device determines a driving mode of the vehicle based on the vehicle information, performs sound shift control for the speakers based on the driving mode, and controls the seat vibration in conjunction with the sound shift control.

20 Claims, 11 Drawing Sheets

(56) References Cited

U.S. PATENT DOCUMENTS

2024/0326837 A1* 10/2024 Teman ................. B60W 50/16
2025/0010778 A1* 1/2025 Sato ..................... B60N 2/976

FOREIGN PATENT DOCUMENTS

KR       10-2131390 B1    7/2020
WO       2017/025204 A1   2/2017

* cited by examiner

SYSTEM AND METHOD FOR CONTROLLING SOUND OUTPUT IN VEHICLE

CROSS-REFERENCE TO RELATED APPLICATION

This application claims under 35 U.S.C. § 119 (a) the benefit of Korean Patent Application No. 10-2023-0106467, filed in the Korean Intellectual Property Office on Aug. 14, 2023, the entire contents of which are incorporated herein by reference.

BACKGROUND

(a) Technical Field

The present disclosure relates to a system and a method for controlling sound output in a vehicle, more particularly, to the system and method configured to enhance driving sensitivity by controlling output of vehicle sound and/or seat vibration in the vehicle.

(b) Description of the Related Art

In certain vehicles, such as high-performance vehicles and/or electric vehicles (EVs), an electronic sound generator (ESG) is provided for artificially generating a sound to improve auditory emotional quality. The ESG generates a sound suitable for a driving situation of the vehicle under control of a controller. The ESG may be mounted on a cowl top panel of the vehicle. However, an allophone may occur due to interference between parts in a vehicle body weld by the vibration of the ESG. To avoid the occurrence of such an allophone, the cost for structural reinforcement and vibration insulation is prohibitively expensive.

SUMMARY

An aspect of the present disclosure provides a system and a method for controlling sound output in a vehicle to enhance driving sensitivity, e.g., to maximize the effect of implementing high-performance vehicle sensitivity by use of sound shift control and seat vibration control according to a driving condition of the vehicle.

Another aspect of the present disclosure provides a system and a method for controlling sound output in a vehicle to control a sound output time delay for each speaker based on a driving condition of the vehicle to maximize a sense of immersion.

Another aspect of the present disclosure provides a system and a method for controlling sound output to enhance driving sensitivity in a vehicle to assign vibration to a seat based on a driving condition.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, a system for controlling sound output in a vehicle may include a sensing device that obtains vehicle information of the vehicle, a sound device that plays and outputs a vehicle sound through speakers, a seat device that controls seat vibration based on the vehicle sound, and a control device connected with the sensing device, the sound device, and the seat device. The control device may determine a driving mode of a vehicle based on the vehicle information, may perform sound shift control for the speakers based on the driving mode, and may control the seat vibration in conjunction with the sound shift control.

The driving mode may be classified as a low-speed oscillation mode, an acceleration mode, or a deceleration cornering mode.

The control device may sequentially control sound outputs of the speakers based on a sound shift algorithm.

The control device may calculate volume and timbre of the vehicle sound based on accelerator pedal responsiveness.

The control device may distribute a sound source for each speaker with regard to a position of each of the speakers and a frequency band of each of the speakers and may calculate a time delay for each speaker for playing and outputting the distributed sound source.

The control device may generate the sound shift algorithm using the result of calculating the volume and the timbre of the vehicle sound, the result of distributing the sound source for each speaker, and the result of calculating the time delay for each speaker.

The sound device may play the vehicle sound and may sequentially output the vehicle sound between a speaker installed at the front of the vehicle and a speaker installed at the rear of the vehicle.

The sound device may play the vehicle sound and may alternately output the vehicle sound from a speaker installed at the left of the vehicle to a speaker installed at the right of the vehicle.

The control device may determine at least one of a vibration period, a vibration peak, a vibration generation position, vibration strength, or a vibration pattern based on the driving mode and may generate a vibration profile.

A vehicle may include a system for controlling sound output according to the present disclosure.

According to another aspect of the present disclosure, a method for controlling sound output in a vehicle may include receiving vehicle information from a sensing device, determining a driving mode of a vehicle based on the vehicle information, performing sound shift control for speakers for playing and outputting a vehicle sound based on a driving mode, and controlling to control seat vibration in conjunction with the sound shift.

The driving mode may be classified as a low-speed oscillation mode, an acceleration mode, or a deceleration cornering mode.

The performing of the sound shift control may include sequentially controlling sound outputs of the speakers based on a sound shift algorithm.

The performing of the sound shift control may include calculating volume and timbre of the vehicle sound based on accelerator pedal responsiveness.

The performing of the sound shift control may include distributing a sound source for each speaker with regard to a position of each of the speakers and a frequency band of each of the speakers and calculating a time delay for each speaker for playing and outputting the distributed sound source.

The performing of the sound shift control may include generating the sound shift algorithm using the result of calculating the volume and the timbre of the vehicle sound, the result of distributing the sound source for each speaker, and the result of calculating the time delay for each speaker.

The performing of the sound shift control may include playing the vehicle sound and sequentially outputting the vehicle sound from a speaker installed at the front of the vehicle to a speaker installed at the rear of the vehicle.

The performing of the sound shift control may include playing the vehicle sound and sequentially outputting the vehicle sound from a speaker installed at the rear of the vehicle to a speaker installed at the front of the vehicle.

The performing of the sound shift control may include playing the vehicle sound and alternately outputting the vehicle sound from a speaker installed at the left of the vehicle to a speaker installed at the right of the vehicle.

The controlling of the seat vibration may include determining at least one of a vibration period, a vibration peak, a vibration generation position, vibration strength, or a vibration pattern based on the driving mode and generating a vibration profile.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
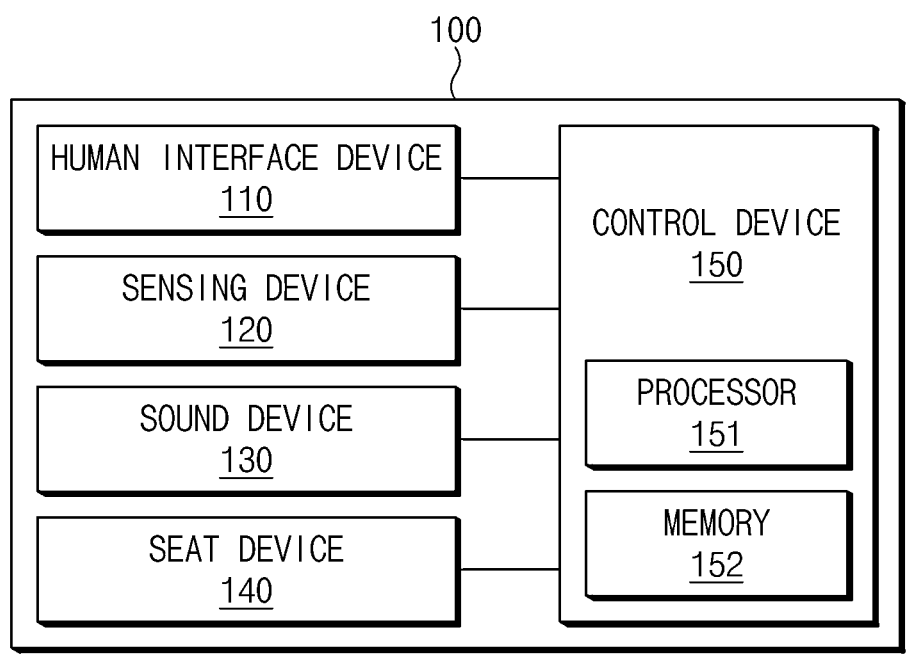
FIG. 1 is a block diagram illustrating a configuration of a system for controlling sound output in a vehicle according to embodiments of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In the drawings, the same reference numerals will be used throughout to designate the same or equivalent components. In addition, a detailed description of well-known features or functions will be ruled out in order not to unnecessarily obscure the gist of the present disclosure.

In describing components of exemplary embodiments of the present disclosure, the terms first, second, A, B, (a), (b), and the like may be used herein. These terms are only used to distinguish one component from another component, but do not limit the corresponding components irrespective of the order or priority of the corresponding components. Furthermore, unless otherwise defined, all terms including technical and scientific terms used herein are to be interpreted as is customary in the art to which this present disclosure belongs. It will be understood that terms used herein should be interpreted as having a meaning that is consistent with their meaning in the context of this present disclosure and the relevant art and will not be interpreted in an idealized or overly formal sense unless expressly so defined herein.

FIG. 1 is a block diagram illustrating a configuration of a system for providing driving sensitivity in a vehicle according to embodiments of the present disclosure.

A system 100 for providing driving sensitivity may be applied to an electrified vehicle which drives using power generated by its electric motor. Referring to FIG. 1, the system 100 for providing the driving sensitivity may include a human interface device 110, a sensing device 120, a sound device 130, a seat device 140, and a control device 150, which are connected with each other over an in-vehicle network. The inter-vehicle network may be implemented as a controller area network (CAN), a media oriented systems transport (MOST) network, a local interconnect network (LIN), an Ethernet, X-by-Wire (Flexray), and/or the like.

The human interface device 110 may be a device which helps the system 100 for providing the driving sensitivity and a user (e.g., a driver) to interact with each other. The human interface device 110 may include an input device (e.g., a keyboard, a touch pad, a microphone, a touch screen, and/or the like) for generating data according to manipulation of the user, an output device (e.g., a display, a speaker, a tactile signal output device, and/or the like) for outputting information according to an operation of the system 100 for providing the driving sensitivity, and/or the like. Such a human interface device 110 may be implemented as an audio, video, navigation (AVN) terminal, an in-vehicle infotainment terminal, a telematics terminal, and/or the like.

The sensing device 120 may obtain vehicle information (or driving information) and/or driving environment information (e.g., road information or the like). The sensing device 120 may obtain vehicle information including a vehicle speed, a motor revolution per minute (RPM), motor torque, an accelerator pedal opening amount, a steering wheel steering angle, a tire steering angle, and/or the like using at least one sensor and/or at least one electronic control unit (ECU), which are/is mounted on the vehicle. The at least one sensor may include an accelerator position sensor (APS), a wheel speed sensor, an image sensor, an advanced driver assistance system (ADAS) sensor, a 3-axis accelerometer, an inertial measurement unit (IMU), and/or the like. The at least one ECU may include a motor control unit (MCU), a vehicle control unit (VCU), and/or the like. The sensing device 120 may obtain a vehicle location, a vehicle speed, and/or the like using a global positioning system (GPS).

The sound device 130 may play and output a sound source which is previously stored or is streamed in real time to the outside. The sound device 130 may include a sound playback device, an amplifier, speakers (e.g., a tweeter, a woofer, a subwoofer, and the like), and/or the like. The amplifier may amplify an electrical signal of the sound played from the sound playback device. A plurality of speakers may be installed at different positions inside and/or outside the vehicle. Each of the speakers may convert the electrical signal amplified by the amplifier into a sound wave.

The sound device 130 may play and output a sound to the interior and/or exterior of the vehicle under control of the control device 150. The sound device 130 may adjust and play volume, timbre (or sound quality), a sound image, and the like of the sound under an instruction of the control device 150. The sound device 130 may include a digital signal processor (DSP), microprocessors, and/or the like. The sound device 130 may output the played sound to speakers (or an internal speaker) loaded into the vehicle. Furthermore, the sound device 130 may output the played sound to a speaker (or an external speaker) mounted on the outside of the vehicle.

The seat device 140 may control at least one vibrator mounted on a vehicle seat to generate vibration (or a vibration signal). The at least one vibrator may be installed at a specific position of the vehicle seat, for example, a seat back, a seat cushion, a leg rest, and/or the like. The seat device 140 may adjust a vibration pattern, vibration intensity, a vibration frequency, and/or the like under control of the control device 150.

The seat device 140 may determine a regular pattern and a variable pattern with regard to an environmental condition, such as a weight of the user, a sitting posture of the user, and whether there is a pedestrian, depending on vibration impulse logic.

The seat device 140 may implement sound-based emotional vibration using a sound-based vibration classification algorithm. The seat device 140 may convert a vehicle sound into a vibration signal in a multi-mode depending on the sound-based vibration classification algorithm. The multi-mode may be divided into four types, that is, a beat machine, a simple beat, a natural beat, and a live vocal. The seat device 140 may perform specific frequency filter processing of the converted vibration signal. The seat device 140 may perform post-processing for implementing emotional vibration for the filter-processed vibration signal.

When the vehicle in an acceleration situation, the seat device 140 may generate front and rear vibration (i.e., vibration in a longitudinal direction of the vehicle) on the seat back. When the vehicle in a deceleration situation, the seat device 140 may generate front and rear vibration on the seat back and may additionally generate up and down vibration of the seat cushion (i.e., vibration in a height direction of the vehicle). When the vehicle in a deceleration cornering situation, the seat device 140 may generate left and right vibration (i.e., vibration in a width direction of the vehicle) on the seat back.

The seat device 140 may control an air pocket type neck pillow. The seat device 140 may control a vibrator, an actuator, and/or the like in the neck pillow to provide a haptic effect to the neck of the user sitting on the vehicle seat. The neck pillow may be removably made at a boundary between a seat back and a headrest of the vehicle seat.

The control device 150 may control the overall operation of the system 100 for providing the driving sensitivity. The control device 150 may include a processor 151 and a memory 152. The processor 151 may be implemented as an application specific integrated circuit (ASIC), a digital signal processor (DSP), programmable logic devices (PLD), field programmable gate arrays (FPGA), a central processing unit (CPU), microcontrollers, microprocessors, and/or the like. The memory 152 may be a non-transitory storage medium which stores instructions executed by the processor 151. The memory 152 may include at least one of storage media such as a random access memory (RAM), a static RAM (SRAM), a read only memory (ROM), a programmable ROM (PROM), an electrically erasable and programmable ROM (EEPROM), an erasable and programmable ROM (EPROM), a hard disk drive (HDD), a solid state disk (SSD), an embedded multimedia card (eMMC), universal flash storage (UFS), or web storage.

The memory 152 may store sound sources used as a vehicle sound (or a virtual sound or a driving sound). For example, the memory 152 may store an acceleration sound, a cornering sound, an exhaust sound, a backfire sound, and/or the like. The memory 152 may store a sound shift algorithm (SSA), a sound design algorithm (or a sound design program), a user emotional model, driving mode determination logic, and/or the like.

The processor 151 may receive a user input from the human interface device 110. The processor 151 may receive a signal corresponding to the selection of the user for an "emotional care mode" as a user input. The processor 151 may activate the "emotional care mode" depending on the user input. In other words, when the user selects the "emotional care mode", the processor 151 may execute an emotional care function.

When the emotional care mode is activated, the processor 151 may obtain vehicle information using the sensing device 120. The vehicle information may include accelerator pedal responsiveness, a vehicle speed, an RPM, torque, a steering angle (e.g., a steering angle of the steering wheel), and/or the like.

The processor 151 may determine a driving mode (or a driving condition) of the vehicle based on the vehicle information obtained by the sensing device 120. The driving mode may be divided into a low-speed oscillation mode, an acceleration mode, and a deceleration cornering mode.

The processor 151 may control the sound device 130 to play and output a vehicle sound (e.g., an acceleration sound or a cornering sound) matched with the determined driving mode.

The processor 151 may perform a sound design considering the driving mode of the vehicle using a sound design program. The processor 151 may analyze a signal received from the APS and may determine accelerator pedal responsiveness. The processor 151 may calculate volume and/or timbre of the vehicle sound based on the determined accelerator pedal responsiveness.

The processor 151 may distribute a sound source for each speaker and may calculate a time delay for each speaker. In other words, the processor 151 may distribute a sound source to be played and output by each speaker and may calculate a time when each speaker plays and outputs the distributed sound source.

The processor 151 may generate the SSA using the result of calculating the volume and/or the timbre, the result of distributing the sound source for each speaker, and/or the result of calculating the time delay for each speaker.

The processor 151 may control the sound device 130 to sequentially play and output a vehicle sound from a speaker installed in a front part of the vehicle to a speaker installed in a rear part of the vehicle or may control the sound device 130 to play and output a vehicle sound in a reverse direction.

The processor 151 may control the sound device 130 to play and output a backfire sound and/or an exhaust sound of an exhaust system to the outside through an external speaker. The processor 151 may receive a post-combustion signal according to a user input (e.g., a steering wheel steering angle, accelerator pedal position information, and/or the like). The processor 151 may convert a post-combustion signal into a post-combustion sound. The processor 151 may store a sound source of the previously selected post-combustion sound or may correct the previously stored sound source. Furthermore, the processor 151 may adjust timbre and volume of the post-combustion sound, that is, the exhaust sound. The processor 151 may control the sound device 130 to output an exhaust sound through an external speaker installed at the rear of the vehicle.

The processor 151 may generate a vibration profile based on the played vehicle sound. The processor 151 may transmit the generated vibration profile to the seat device 140. The processor 151 may generate a seat vibration profile using an exhaust sound of an electric vehicle by means of a sound analysis. The processor 151 may reflect a speaker sound to generate a neck pillow vibration profile.

The processor 151 may apply a vibration profile to a seat and a neck pillow with regard to body pressure distribution on the seat according to a sitting posture of the user. The processor 151 may implement optimal vibration with regard to a weight and a sitting posture of the user. The processor 151 may analyze body pressure distribution on a seat back and a seat cushion to determine a sitting posture of the user. The processor 151 may determine a vibration profile according to the sitting posture.

The processor 151 may determine a vibration profile depending on a driving mode. The processor 151 may determine at least one of a vibration period, a vibration peak, a vibration generation position, vibration strength, or a vibration pattern depending on the driving mode and may generate a vibration profile. When the driving mode is a deceleration cornering mode, the processor 151 may differently assign load balances of left and right vibration values of the seat and neck pillow to assign thigh and back vibration in a diagonal direction. When the driving mode is a low-speed oscillation mode, the processor 151 may increase a level of a separate actuator in a zero to hundred mode and may assign a peak time about three times at the beginning of oscillation. When the driving mode is an acceleration mode and when interworking with the APS in speed and amounts of vibration of the seat and the neck pillow are determined, the processor 151 may calculate a vibration exciting force in an X-direction (or a heading direction of the vehicle) and a Z-direction.

The processor 151 may analyze information about a surrounding image of the vehicle to determine a critical situation. The processor 151 may more greatly excite seat vibration when the surrounding environment of the vehicle is determined as the critical situation than when the surrounding environment of the vehicle is not critical.

When a signal is received to excessively excite vibration of a high sound when implementing sound-based vibration, the processor 151 may distribute vibration by means of filtering of an interval recognized as a high-frequency domain to prevent a sense of difference. The processor 151 may determine a position on the seat to generate low sound-based vibration. The processor 151 may differently assign the low sound-based vibration to the seat back and the seat cushion to prevent a sense of difference.

Figure 2:
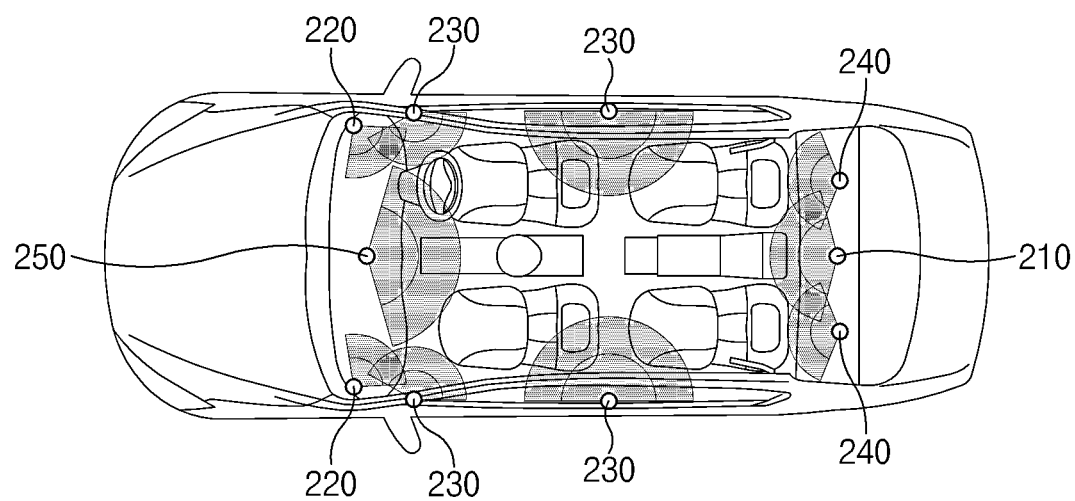
FIG. 2 is a drawing for describing a speaker system according to embodiments of the present disclosure.
Figure 2:
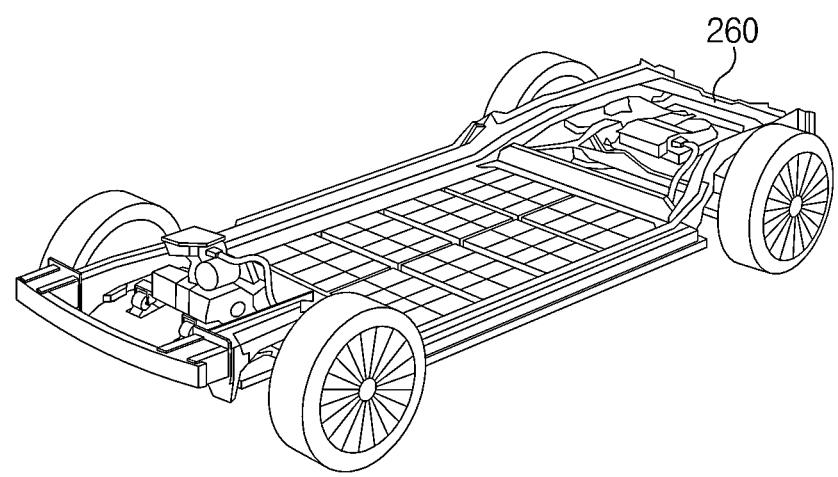

FIG. 2 is a drawing for describing a speaker system according to embodiments of the present disclosure.

Referring to FIG. 2, a speaker system 200 may include a subwoofer 210, tweeters 220, woofers 230, first mid-range speakers 240, a second mid-range speaker 250, and an external speaker 260.

The subwoofer 210 may be a speaker responsible for a low-frequency domain, which may be located in a package tray panel in a rear part of the vehicle. The subwoofer 210 may be installed in a quarter panel or at a lower side of a seat.

The tweeters 220 may be speakers, each of which is responsible for a high-frequency domain, which may be mounted on front door trims.

The woofers 230 may be speakers, each of which is responsible for a mid-frequency domain, which may be mounted on a lower end of a front door trim and/or a lower end of a rear door trim.

The first mid-range speakers 240 may be installed at both sides of a package tray panel at the rear of the vehicle, and may be speakers, each of which is responsible for a mid-frequency domain.

The second mid-range speaker 250 may be installed in a central console at the front of the vehicle and may be a speaker for a mid-frequency.

A 5way speaker system composed of the subwoofer 210, the tweeters 220, the woofers 230, the first mid-range speakers 240, and the second mid-range speaker 250 may be embedded in the interior of the vehicle.

The external speaker 260 may be responsible for a sound output of an audible frequency domain. The external speaker 260 may be mounted on a rear cross member in a rear part of a vehicle body platform at a lower end of the vehicle. The external speaker 260 may output a sound played by a sound device 130 to the outside of the vehicle. The external speaker 260 may convert an electrical signal amplified by an amplifier of the sound device 130 into a sound wave.

Figure 3:
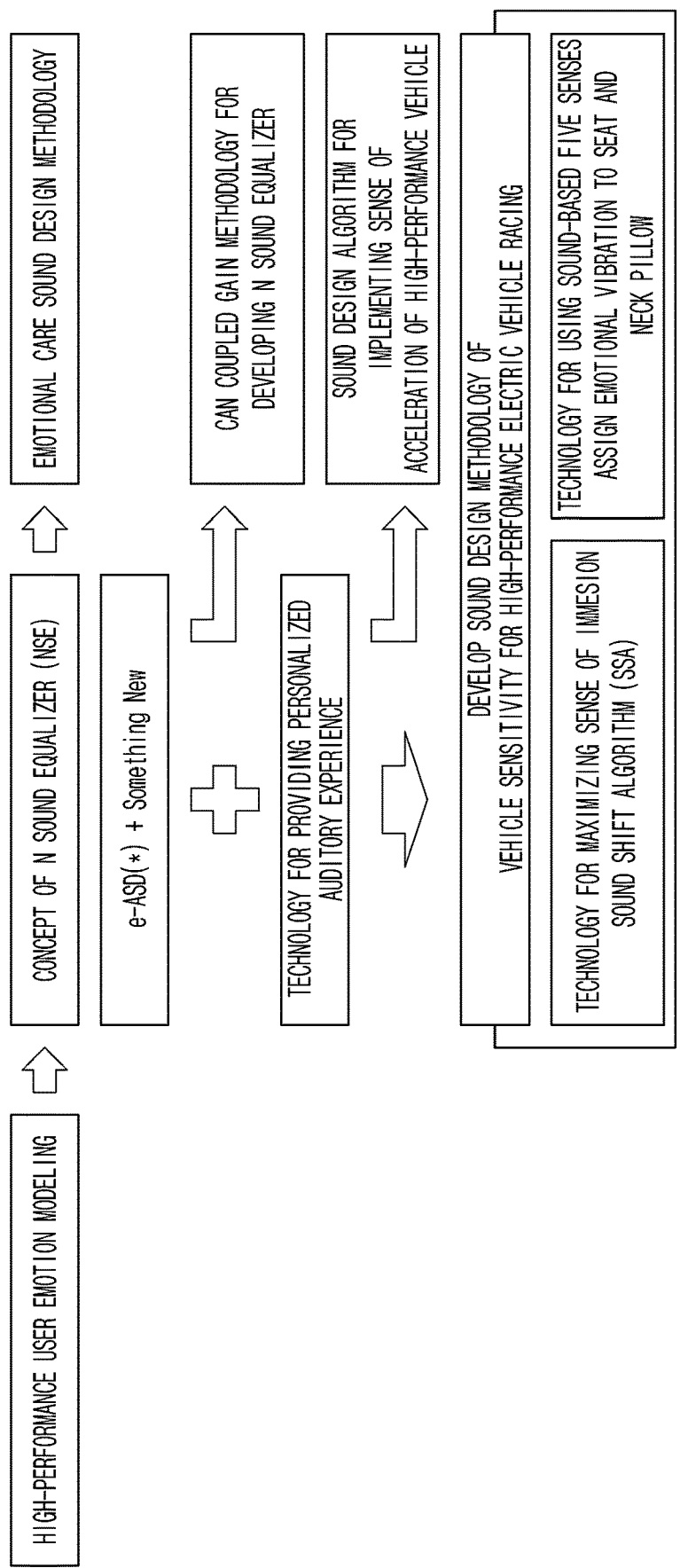
FIG. 3 is a drawing for describing a process of developing a sound design methodology of controlling sound output to enhance vehicle sensitivity useful for high-performance electric vehicle racing according to an embodiment of the present disclosure.

FIG. 3 is a drawing for describing a process of developing a sound design methodology of vehicle sensitivity for high-performance electric vehicle racing according to an embodiment of the present disclosure.

A sound-based emotion factor and a dynamic characteristic-based emotion factor derived by analyzing user needs for a vehicle emotional sound (or analyzing auditory experience modeling) may be reflected to perform high-performance user emotion modeling (or user emotion modeling). The sound-based emotion factor may include acceleration and deceleration of downshift emotion, slip and pedal responsiveness of drift emotion, tire slip and an exhaust sound of power and response emotion, and/or the like. The dynamic characteristic-based emotion factor may include suitable vibration of sound feedback emotion, body stiffness of ride comfort emotion, a chassis balance of maneuverability emotion, and/or the like.

An emotion modeling-based design concept considering personalization and diversification of a user may be derived. Target users may be grouped into a representative user by means of propensity surveys for the target users using a persona technique, and personalization emotion of a user of a high-performance electric vehicle may be modeled using a design thinking process.

The user emotion modeling may include a harmony sound, a fun driving sound, and an adaptable sound. The harmony sound may be a fun healing sound (e.g., memorable RED) in which the concept is fun and harmony and may satisfy differential sound needs for a launching sound (e.g., a zero to hundred sound) of the high-performance electric vehicle. The fun healing sound may apply a formant filter which uses mixing logic for synthesizing an animal sound with an engine sound and/or an exhaust sound and converting an analog voice into a digital sound. The fun driving sound may be a comfortable and familiar sound (e.g., futuristic BLUE) for a user who wants a sense of acceleration and engine emotion. An immersion improvement technology may be applied to the fun driving sound to suit acceleration real sound needs of high-performance engine emotion.

The concept of an N sound equalizer (NSE) is designed to improve a problem in which an allophone is generated and cost increases because of creating a sporty sound using vehicle body vibration in a driver (e.g., electronic sound generator (ESG)) type mounted on a cowl top panel in an existing technology. The concept of an engine sound equalizer (ESE) of an internal combustion engine high-performance vehicle is implemented by developing an emotional sound design methodology of the high-performance electric vehicle. The emotional sound design methodology may include a CAN coupled gain methodology and a sound design algorithm for implementing a sense of acceleration of the high-performance vehicle. The emotional sound design methodology may be a useful methodology available to develop high-performance electric vehicle content for a fun healing sound (e.g., memorable RED) and a comfortable and familiar sound (e.g., futuristic BLUE) based on user experience (UX).

Figure 4:
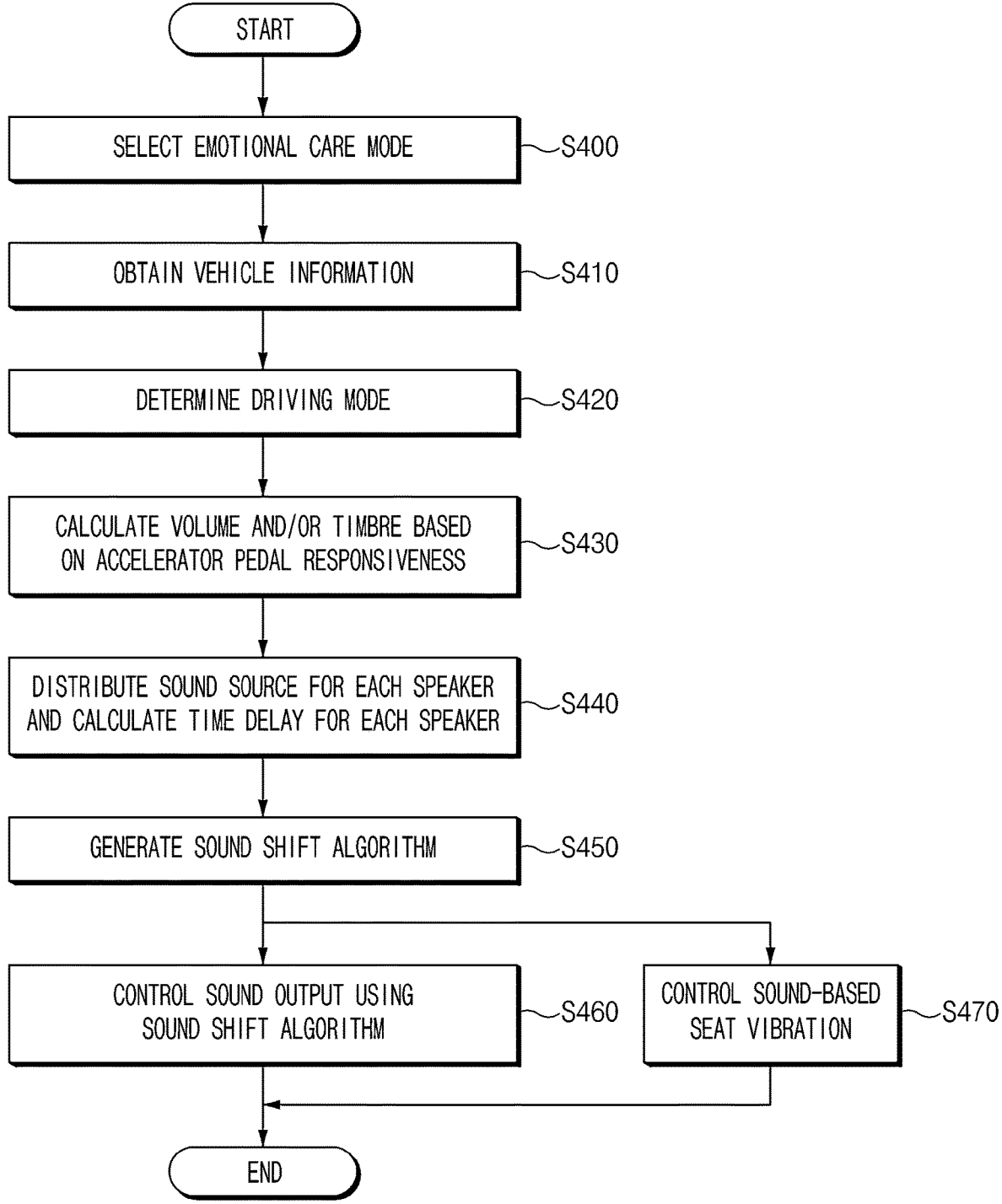
FIG. 4 is a flowchart illustrating a method for controlling sound output in a vehicle according to embodiments of the present disclosure.

FIG. 4 is a flowchart illustrating a method for providing driving sensitivity in a vehicle according to embodiments of the present disclosure.

In S400, a control device 150 may receive data (or a signal) indicating the selection of an emotional care mode from a human interface device 110. For example, when a user selects a virtual sound menu on an AVN screen and selects a comfortable and familiar sound, "futuristic BLUE", among sub-menus of the virtual sound menu, the human interface device 110 may transmit a signal (or a command) corresponding to the selection of the user. The control device 150 may receive the signal transmitted from the human interface device 110 and may execute an emotional care function of the concept of "futuristic BLUE" depending on the received signal.

In S410, the control device 150 may obtain vehicle information by means of a sensing device 120. The vehicle information may include accelerator pedal responsiveness, a vehicle speed, a steering wheel steering angle, and/or the like.

In S420, the control device 150 may determine a driving mode (or a driving condition) based on the obtained vehicle information. The driving mode may be divided into a low-speed oscillation mode, an acceleration mode, and a deceleration cornering mode.

In S430, the control device 150 may calculate volume and/or timbre based on the accelerator pedal responsiveness in the determined driving mode. The control device 150 may calculate volume and/or timbre of the vehicle sound according to the accelerator pedal responsiveness using a sound design program.

In S440, the control device 150 may distribute a sound source for each speaker and may calculate a time delay for each speaker. The control device 150 may distribute a sound source for each speaker based on the accelerator pedal responsiveness and may calculate a time delay for each speaker.

In S450, the control device 150 may generate a sound shift algorithm (SSA) based on the calculated volume and/or timbre, the result of distributing the sound source for each speaker, and the time delay for each speaker.

In S460, the control device 150 may control a sound output using the SSA. A sound device 130 may play and output a vehicle sound through a speaker under an instruction of the control device 150. The sound device 130 may adjust volume and/or timbre of the vehicle sound played based on the volume and/or the timbre calculated by the control device 150. Furthermore, the sound device 130 may control a sound output time point for each speaker using the SSA.

In S470, the control device 150 may control sound-based seat vibration. The seat device 140 may generate seat vibration based on the vehicle sound played by the sound device 130. The seat device 140 may control each of operations of vibrators installed in a seat back, a seat cushion, and/or a neck pillow.

Figure 5:
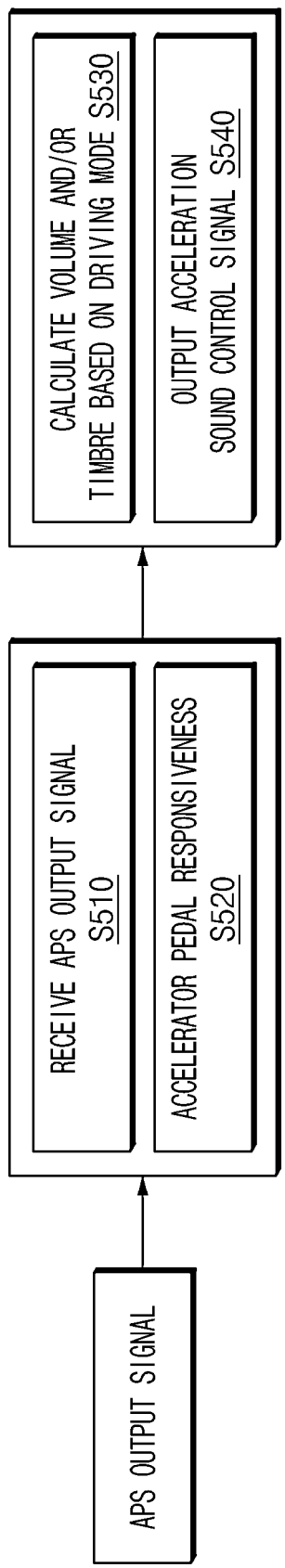
FIG. 5 is a flowchart illustrating a process of controlling an acceleration sound according to embodiments of the present disclosure.

FIG. 5 is a flowchart illustrating a process of controlling an acceleration sound according to embodiments of the present disclosure.

A control device 150 may perform a zero to hundred sound emotion design by means of APS control. The APS control is a function of adjusting an accelerator pedal opening amount, which is a process for a sound design considering a driving condition such as low-speed oscillation, acceleration, or deceleration cornering of a vehicle.

In S510, the control device 150 may receive an APS output signal output from an APS. In S520, the control device 150 may determine accelerator pedal responsiveness based on the received APS output signal. The accelerator pedal responsiveness may be divided into "middle", "full", and "boost". A driver fully presses the accelerator pedal in a low-speed oscillation condition. The driver presses the accelerator pedal in a boost mode in an acceleration condition. The driver presses the accelerator pedal in a middle mode in a deceleration cornering condition.

In S530, the control device 150 may calculate power, that is, volume and timbre for a sense of acceleration of driving based on the accelerator pedal responsiveness. In S540, the control device 150 may output an acceleration sound control signal based on the calculated power.

The control device 150 may obtain information, such as a speed, an RPM, a yaw rate, or a side slip angle, in a vehicle driving condition and may calculate volume and timbre in a low-speed oscillation state, an acceleration state, and a decelerating cornering state through the APS output signal by means of a sound design program.

Figure 6:
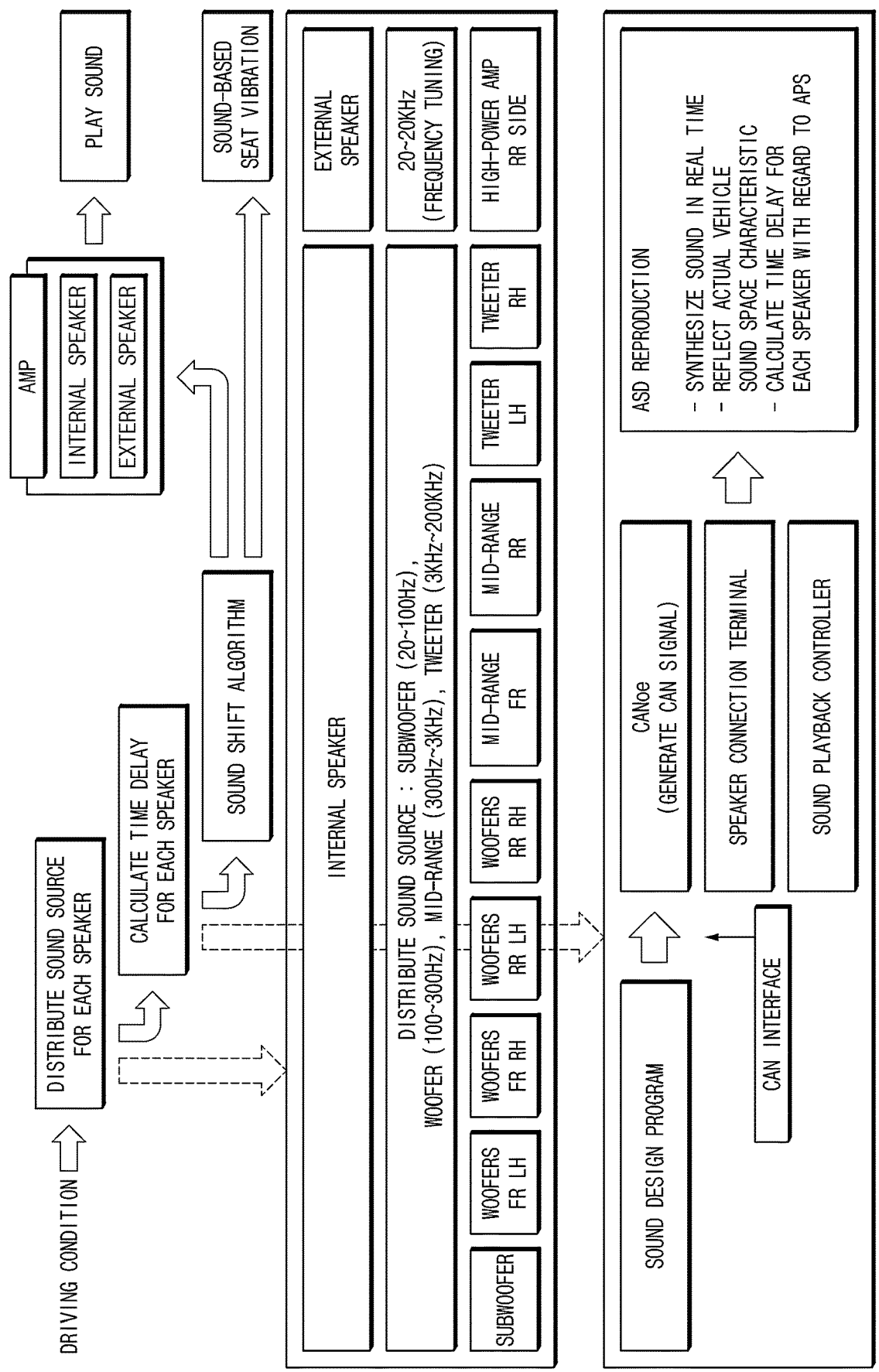
FIG. 6 is a drawing for describing a process of distributing a sound source for each speaker and calculating a time delay for each speaker, which is associated with the present disclosure.

FIG. 6 is a drawing for describing a process of distributing a sound source for each speaker and calculating a time delay for each speaker, which is associated with the present disclosure.

A control device 150 may distribute a sound source for each speaker and may calculate a time delay for each speaker depending on a driving condition (i.e., a driving mode) to implement a sound shift algorithm (SSA).

The control device 150 may identify a position and a frequency band of each speaker. The control device 150 may distribute a sound source to each speaker with regard to the position and the frequency band of each speaker in the driving condition. The control device 150 may identify left and right positions of a subwoofer, woofers, and mid-ranges of an internal speaker and may distribute a sound source with regard to the frequency band of each speaker.

The control device 150 may tune a frequency of an external speaker which serves as a high-power amplifier depending on a sound type for a dramatic effect of a high-performance electric vehicle.

The control device 150 may calculate a time delay for each speaker through a preprocessing process for implementing a sound shift algorithm (SSA).

The control device 150 may calculate a time delay for each speaker using a hardware in the loop simulation (HiLS) process of a tuning simulator. The control device 150 may pass through a CAN interface process by means of a sound design program of a high-performance electric vehicle and may proceed with a process for a controller area network open environment (CANoe) (generating a CAN signal), a speaker connection terminal, and a sound playback controller. Thereafter, the control device 150 may synthesize a sound in a real time by means of ASD reproduction. Furthermore, the control device 150 may reflect an actual vehicle state sound space characteristic and may calculate a time delay for each speaker with regard to an APS.

The evaluation of immersion for a vehicle sound and seat vibration may proceed in a virtual reality (VR) environment. Real road data-based VR simulation of city driving, highway driving, country road driving, and tunnel driving, and the like may be performed by a driving scenario editor. A user may proceed with evaluation for immersion for a vehicle sound and seat vibration by means of the VR simulation.

Figure 7:
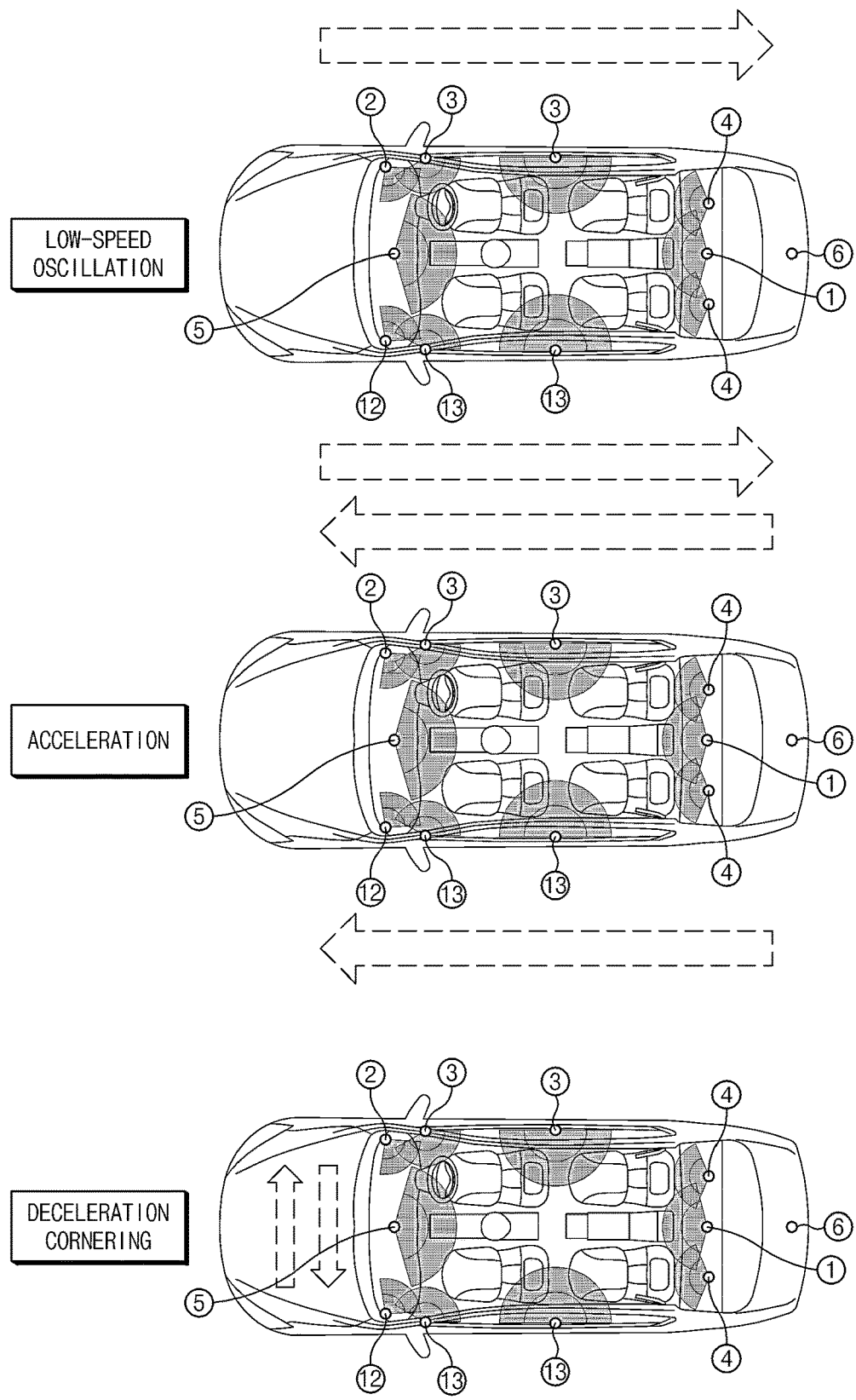
FIG. 7 is a drawing for describing a sound shift associated with the present disclosure.

FIG. 7 is a drawing for describing a sound shift associated with the present disclosure.

A control device 150 of a system 100 for providing driving sensitivity may adjust a time point when a sound is played and output for each speaker depending on a driving mode (or a driving condition) using a sound shift algorithm (SSA).

As an example, when the driving mode of the vehicle is a low-speed oscillation mode, the control device 150 may sequentially play and output a sound source distributed to each speaker from speakers ⑤, ②, ⑫ at the front of a vehicle to speakers ③, ⑬, ①, ④ at the rear of the vehicle. Furthermore, the control device 150 may control a sound device 130 to play and output an exhaust sound through an external speaker, that is, speaker ⑥, thus implementing a backfire impact effect.

As another example, when the driving mode of the vehicle is an acceleration mode, in a reverse order in which the driving mode of the vehicle is the low-speed oscillation mode, the control device 150 may play and output a sound through speaker ⑥ which is the external speaker, may play and output a sound in an order of speakers ④, ①, ③, and ⑬, and may play and output a sound in an order of speakers ②, ⑫, and ⑤ at the front of the vehicle.

As another example, when the driving mode of the vehicle is a deceleration cornering mode, the control device 150 may determine whether the vehicle makes a left turn or a right turn. The control device 150 may play and output a sound through speakers ② and ③ at the right of vehicle when the vehicle makes a left turn and may then play and output a sound through speakers ⑫ and ⑬ at the left of the vehicle. The control device 150 may play and output a sound from speakers ⑫ and ⑬ at the left of the vehicle to speakers ② and ③ at the right of the vehicle when the vehicle makes a right turn. The control device 150 may output an alternately played sound to a speaker installed at the left of the vehicle and a speaker installed at the right of the vehicle.

Figure 8:
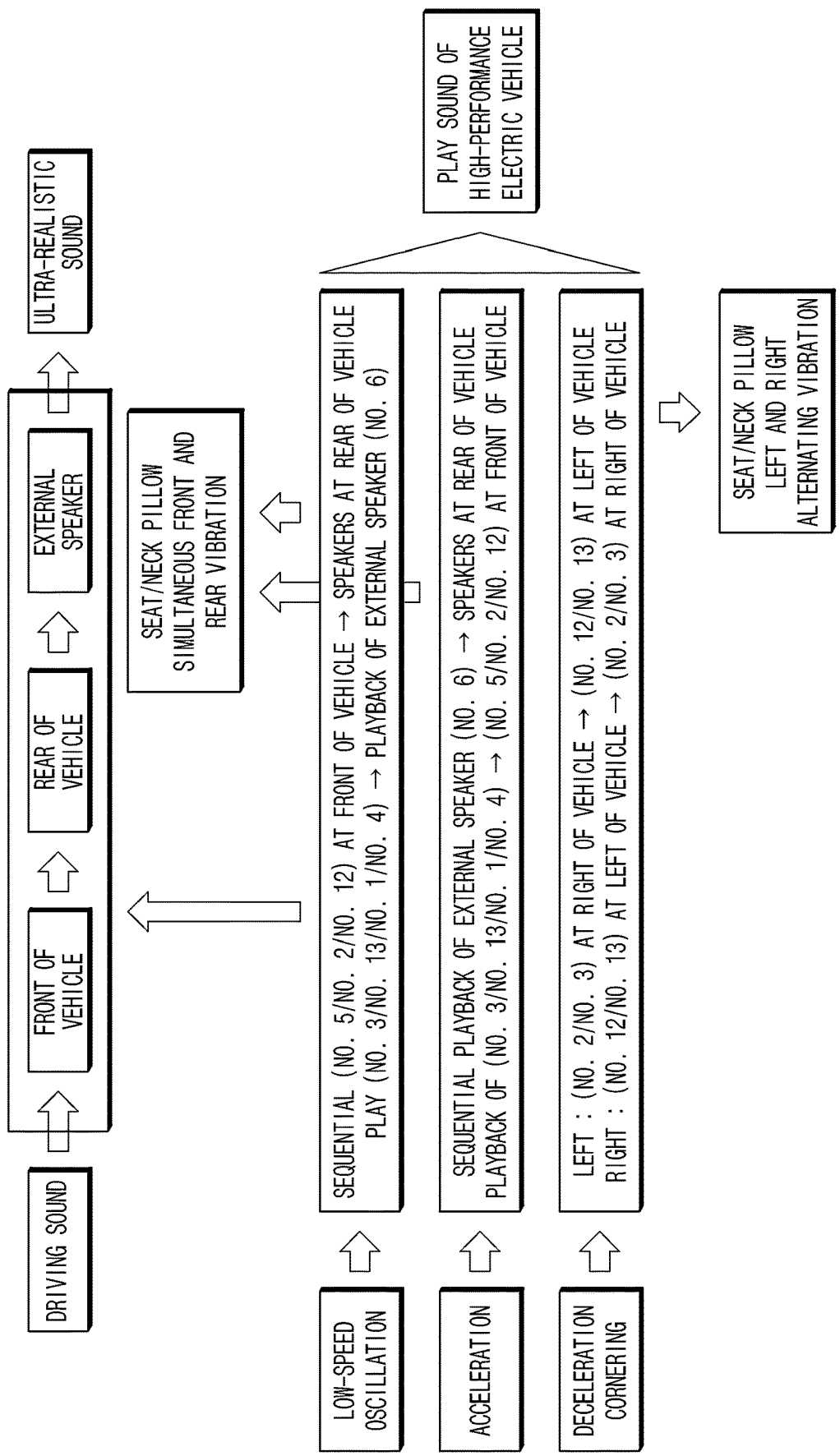
FIG. 8 is a drawing illustrating sound shift algorithm control logic associated with the present disclosure.

FIG. 8 is a drawing illustrating sound shift algorithm control logic associated with the present disclosure.

A control device 150 may calculate volume and timbre according to accelerator pedal responsiveness using a sound design program in a driving condition and may perform sound source distribution for each speaker and time delay calculation for each speaker. The control device 150 may assign a time delay to interior and exterior speakers of a vehicle by means of a sound shift algorithm (SSA).

The control device 150 may reflect control logic in a vehicle AMP with regard to accelerator pedal responsiveness and a speed upon low-speed oscillation. A separated sound source may be sequentially played in the direction of an interior rear speaker from an interior front speaker, logic in which an exhaust sound finally is played through an external speaker, and sound-based emotional vibration may be implemented in a front and rear direction to maximize a sense of immersion of a user.

Sound-based emotional vibration may be implemented in a front and rear direction through a process of playing a sound source from an external speaker of the vehicle to the interior front speaker through the interior rear speaker in a reverse direction upon acceleration, thus doubling a sense of speed.

Logic by a time delay between left and right speakers may be implemented according to a left turn or a right turn upon deceleration cornering, and sound-based emotional vibration may be reflected as left and right alternating emotional vibration.

The control device 150 may optimize a time delay between speakers and volume control logic on a system-by-system basis using HiLS of the tuning simulator and may apply the optimized time delay and the optimized volume control logic to an actual vehicle. A sound shift algorithm (SSA) may be turned in a virtual environment by means of a program rather than an actual vehicle test when tuning the SSA to reduce development cost. Furthermore, the control device 150 may optimize a sound image with regard to the Binaural Effect and the Haas Effect.

Figure 9:
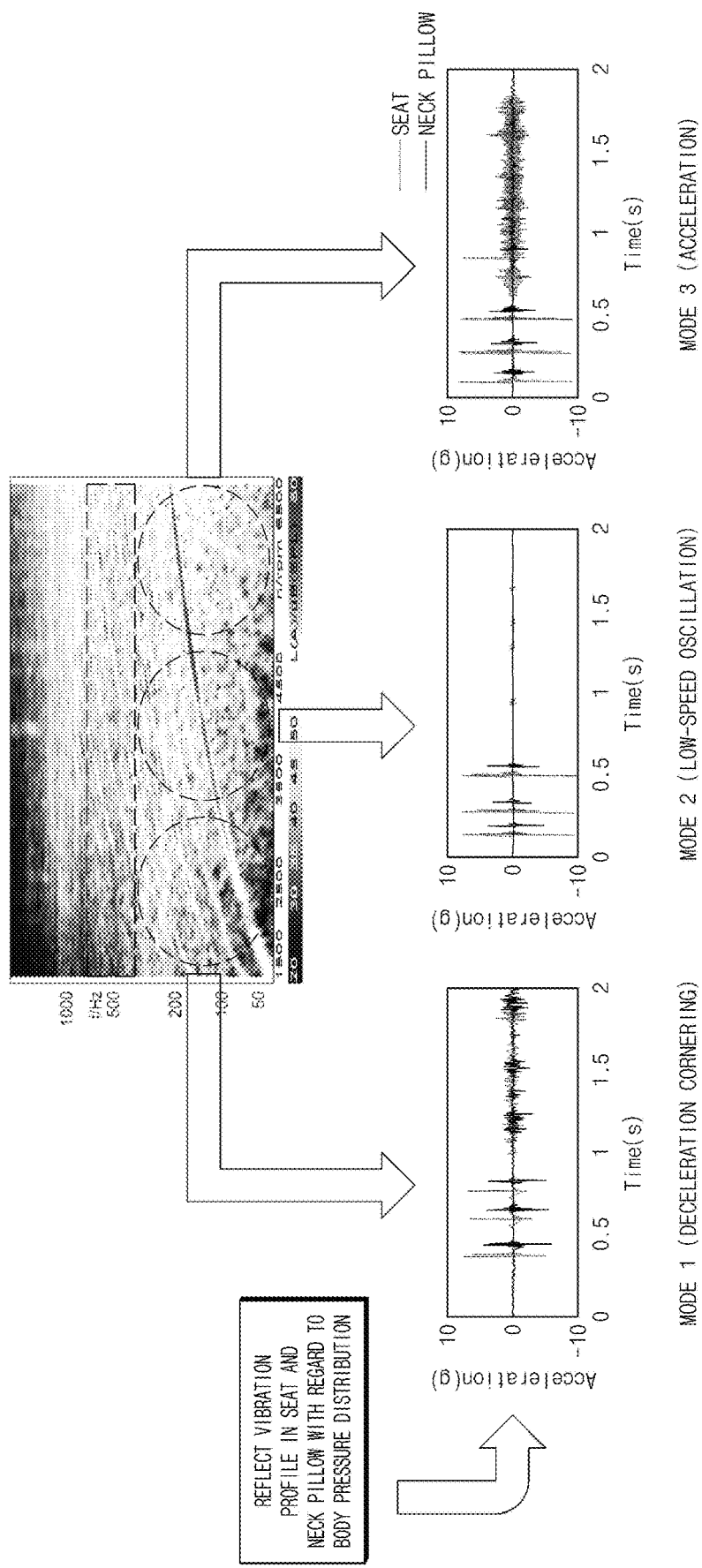
FIG. 9 is a drawing illustrating generating a vibration profile depending on a sitting posture according to embodiments of the present disclosure.

FIG. 9 is a drawing illustrating generating a vibration profile depending on a sitting posture according to embodiments of the present disclosure.

Referring to FIG. 9, a control device 150 may determine a sitting posture of a user with regard to body pressure distribution on a seat. The control device 150 may reflect a vibration profile according to the sitting posture in a seat and a neck pillow. When only the waist of the user is in close contact with a seat back, the control device 150 may apply a vibration profile in mode 1 to the seat and the neck pillow. When only the back and the waist of the user are in close contact with the seat back, the control device 150 may apply a vibration profile in mode 2 or 3 to the seat and the neck pillow.

The control device 150 may determine a vibration profile depending on a driving mode. When the driving mode is a deceleration cornering mode, the control device 150 may apply the vibration profile in mode 1 to the seat and the neck pillow. When the driving mode is a low-speed oscillation mode, the control device 150 may apply the vibration profile in mode 2 to the seat and the neck pillow. When the driving mode is an acceleration mode, the control device 150 may apply the vibration profile in mode 3 to the seat and the neck pillow.

Figure 10:
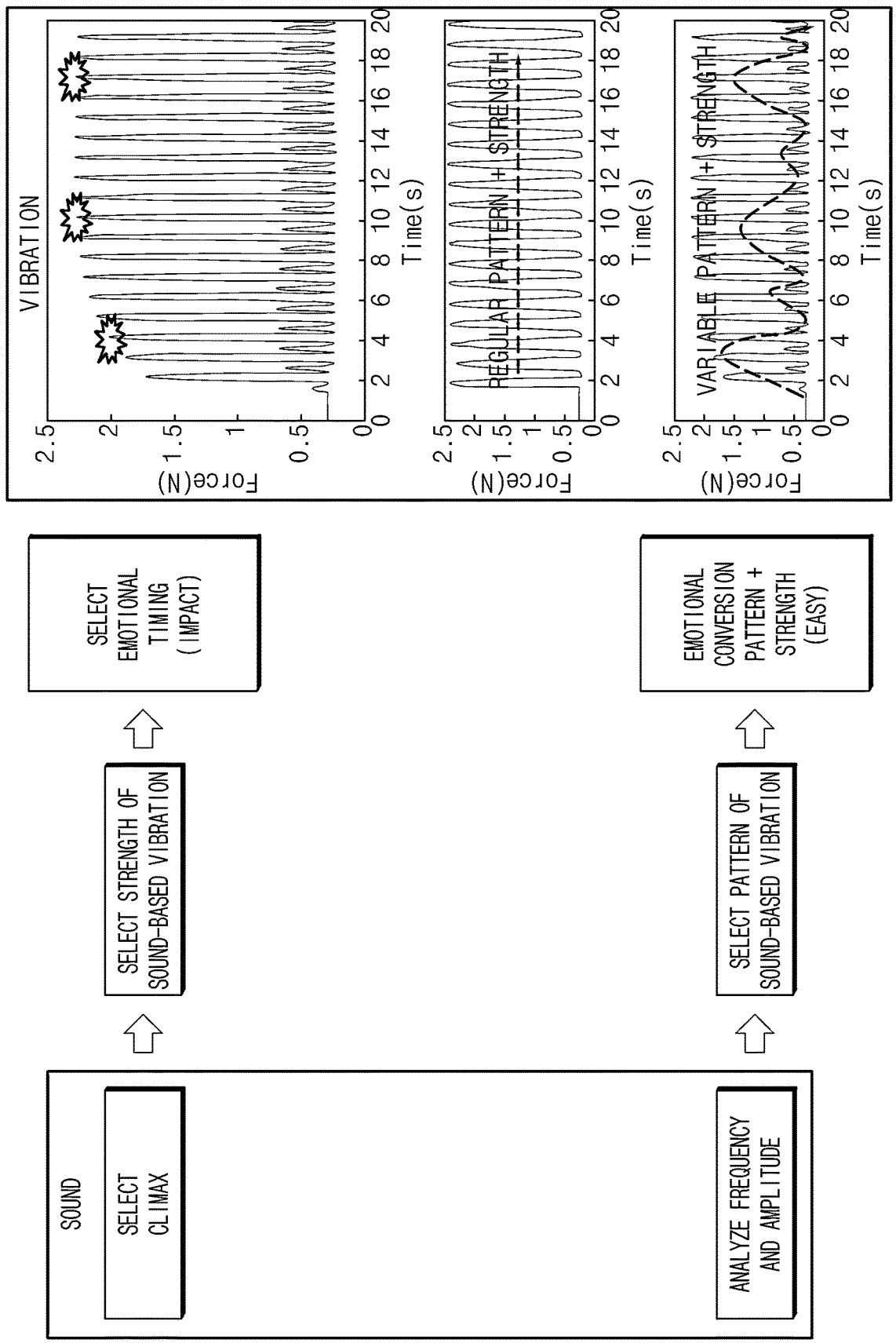
FIG. 10 is a drawing for describing a process of converting a sound into a vibration profile according to embodiments of the present disclosure.

FIG. 10 is a drawing for describing a process of converting a sound into a vibration profile according to embodiments of the present disclosure.

A control device 150 may derive a sound characteristic from a vehicle sound. The control device 150 may select a climax of the vehicle sound and may analyze a frequency and an amplitude of the vehicle sound.

The control device 150 may determine vibration strength and a vibration pattern based on the sound characteristic. The control device 150 may select emotional timing (i.e., an impact) based on the sound characteristic.

Furthermore, the control device 150 may determine an emotional conversion pattern and strength based on the sound characteristic. The emotional conversion pattern may be a regular pattern or a variable pattern.

When a vehicle performs deceleration cornering, the control device 150 may generate initial impact peak vibration and may then provide easy repetitive vibration.

When the vehicle performs low-speed oscillation, the control device 150 may provide excessive peak vibration in which an initial climax is maximized and may then assign gentle vibration When the vehicle accelerates, the control device 150 may determine a period and a peak of vibration depending on slow or rapid acceleration and may provide initial impact vibration to provide vibration at strength of a middle level. Vibration sensitivity on a seat and a neck pillow may be tuned by an algorithm by means of efficacy evaluation.

Figure 11:
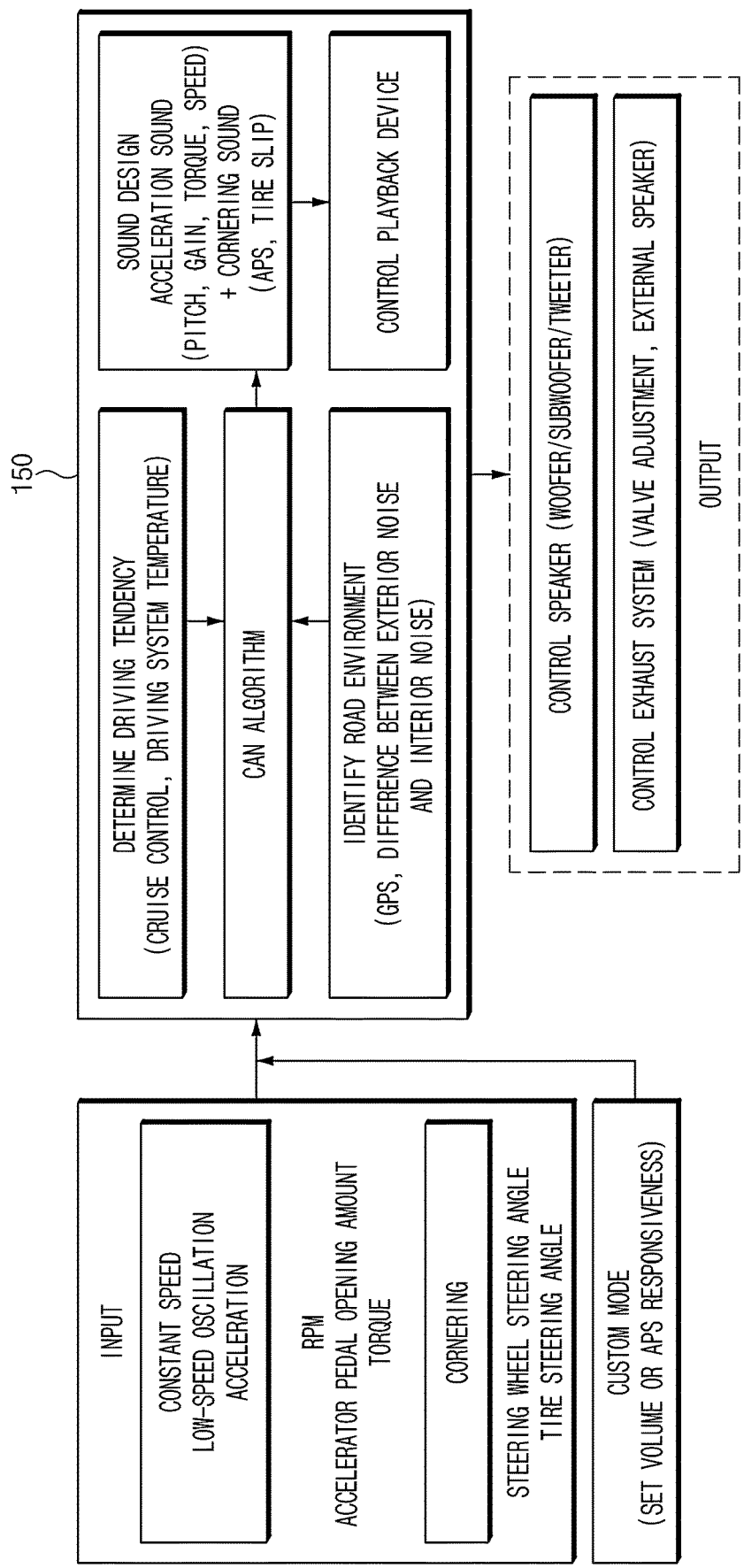
FIG. 11 is a drawing for describing an acceleration sound design according to embodiments of the present disclosure.

FIG. 11 is a drawing for describing an acceleration sound design according to embodiments of the present disclosure.

A control device 150 may determine a driving mode by means of vehicle information, for example, an RPM, torque, or a steering angle, which is obtained by a sensing device 120. The driving mode may be divided into a low-speed oscillation mode, an acceleration mode, and/or a deceleration cornering mode.

The control device 150 may output a virtual sound, that is, an acceleration sound, a cornering sound, and/or the like to a sound device 130 by means a CAN algorithm, a sound design, and playback device control.

The control device 150 may determine a driving tendency based on information such as cruise control and a driving system temperature by means of the CAN algorithm. The control device 150 may determine a road environment based on information such as GPS information and a difference between exterior noise and interior noise based on the CAN algorithm. The control device 150 may design a virtual sound based on the determined driving tendency and the determined road environment. The control device 150 may design an acceleration sound based on a pitch, a gain, torque, a speed, and the like. The control device 150 may design a cornering sound based on an APS, a tire slip, and the like.

The control device 150 may control a playback device (e.g., a sound device 130) to play the designed virtual sound. The playback device may adjust sound quality, volume, and the like of the played virtual sound under an instruction of the control device 150. The control device 150 may control a speaker and an exhaust system to output the virtual sound played by the playback device.

Embodiments of the present disclosure may maximize the effect of implementing high-performance vehicle sensitivity by means of sound shift control and seat vibration control according to a driving condition of the vehicle, thus providing the user with improved sensual sensitivity.

Embodiments of the present disclosure may adjust a sound output time delay for each speaker by means of sound shift control according to a driving condition of the vehicle, thus maximizing a sense of immersion.

Furthermore, embodiments of the present disclosure may control seat vibration based on a sound depending on a driving condition of the vehicle, thus providing sound-based five senses.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims. Therefore, embodiments of the present disclosure are not intended to limit the technical spirit of the present disclosure, but provided only for the illustrative purpose. The scope of the present disclosure should be construed on the basis of the accompanying claims, and all the technical ideas within the scope equivalent to the claims should be included in the scope of the present disclosure.

What is claimed is:

1. A system for controlling sound output in a vehicle, the system comprising:
   a sensing device configured to obtain vehicle information of the vehicle;
   a sound device configured to play and output a vehicle sound through speakers;
   a seat device configured to control seat vibration based on the vehicle sound; and
   a control device connected with the sensing device, the sound device, and the seat device,
   wherein the control device is configured to:
   determine a driving mode of the vehicle based on the vehicle information,
   perform sound shift control for the speakers based on the driving mode, control the seat vibration in conjunction with the sound shift control, and calculate a time delay for each of the speakers for playing and outputting a distributed sound source.

2. The system of claim 1, wherein the driving mode is classified as a low-speed oscillation mode, an acceleration mode, or a deceleration cornering mode.

3. The system of claim 1, wherein the control device sequentially controls sound outputs of the speakers based on a sound shift algorithm.

4. The system of claim 3, wherein the control device calculates volume and timbre of the vehicle sound based on accelerator pedal responsiveness.

5. The system of claim 4, wherein the control device distributes a sound source for each of the speakers with regard to a position of each of the speakers and a frequency band of each of the speakers.

6. The system of claim 5, wherein the control device generates the sound shift algorithm using the result of calculating the volume and the timbre of the vehicle sound, the result of distributing the sound source for each of the speakers, and the result of calculating the time delay for each of the speakers.

7. The system of claim 1, wherein the sound device plays the vehicle sound and sequentially outputs the vehicle sound between a speaker installed at a front of the vehicle and a speaker installed at a rear of the vehicle.

8. The system of claim 1, wherein the sound device plays the vehicle sound and alternately outputs the vehicle sound from a speaker installed at a left of the vehicle to a speaker installed at a right of the vehicle.

9. The system of claim 1, wherein the control device determines at least one of a vibration period, a vibration peak, a vibration generation position, vibration strength, or a vibration pattern based on the driving mode and generates a vibration profile.

10. A vehicle comprising the system of claim 1.

11. A method for controlling sound output in a vehicle, the method comprising:

receiving, by a sensing device, vehicle information of the vehicle;

determining, by a control device, a driving mode of the vehicle based on the vehicle information;

performing, by the control device, sound shift control for speakers for playing and outputting a vehicle sound based on the driving mode of the vehicle;

controlling, by the control device, seat vibration in conjunction with the sound shift control of the speakers; and calculating, by the control device, a time delay for each of the speakers for playing and outputting a distributed sound source.

12. The method of claim 11, wherein the driving mode is classified as a low-speed oscillation mode, an acceleration mode, or a deceleration cornering mode.

13. The method of claim 11, wherein performing the sound shift control includes:

sequentially controlling sound outputs of the speakers based on a sound shift algorithm.

14. The method of claim 13, wherein performing the sound shift control includes:

calculating volume and timbre of the vehicle sound based on accelerator pedal responsiveness.

15. The method of claim 14, wherein performing the sound shift control includes:

distributing a sound source for each of the speakers with regard to a position of each of the speakers and a frequency band of each of the speakers.

16. The method of claim 15, wherein performing the sound shift control includes:

generating the sound shift algorithm using the result of calculating the volume and the timbre of the vehicle sound, the result of distributing the sound source for each of the speakers, and the result of calculating the time delay for each of the speakers.

17. The method of claim 11, wherein performing of sound shift control includes:

playing the vehicle sound and sequentially outputting the vehicle sound from a speaker installed at a front of the vehicle to a speaker installed at a rear of the vehicle.

18. The method of claim 11, wherein performing the sound shift control includes:

playing the vehicle sound and sequentially outputting the vehicle sound from a speaker installed at a rear of the vehicle to a speaker installed at a front of the vehicle.

19. The method of claim 11, wherein performing the sound shift control includes:

playing the vehicle sound and alternately outputting the vehicle sound from a speaker installed at a left of the vehicle to a speaker installed at a right of the vehicle.

20. The method of claim 11, wherein controlling the seat vibration includes:

determining at least one of a vibration period, a vibration peak, a vibration generation position, vibration strength, or a vibration pattern based on the driving mode and generating a vibration profile.

* * * * *